United States Patent
Ksiezopolski et al.

(10) Patent No.: US 8,366,168 B1
(45) Date of Patent: Feb. 5, 2013

(54) OVERLAPPING COMPLEMENTARY BULB SEAL

(75) Inventors: Edwin E. Ksiezopolski, Granger, IN (US); Norman L. Newhouse, Mishawaka, IN (US)

(73) Assignee: Lifetime Industries, Inc., Rogers, MN (US)

( * ) Notice: Subject to any disclaimer, the term of this patent is extended or adjusted under 35 U.S.C. 154(b) by 0 days.

(21) Appl. No.: 13/306,644

(22) Filed: Nov. 29, 2011

Related U.S. Application Data

(60) Provisional application No. 61/417,743, filed on Nov. 29, 2010.

(51) Int. Cl.
*B60P 3/34* (2006.01)
*E06B 7/16* (2006.01)

(52) U.S. Cl. ............ 296/26.01; 296/26.12; 296/165; 52/67; 49/475.1; 49/482.1; 49/493.1; 49/495.1; 49/498.1

(58) Field of Classification Search .......... 296/26.01, 296/26.08, 26.09, 26.12, 26.13, 165, 171, 296/175, 93, 146.9, 154; 52/67; 277/648; 49/475.1, 482.1, 493.1, 495.1, 498.1
See application file for complete search history.

(56) References Cited

U.S. PATENT DOCUMENTS

| | | | |
|---|---|---|---|
| 6,966,590 B1 * | 11/2005 | Ksiezopolki et al. | ...... 296/26.01 |
| 7,614,676 B2 | 11/2009 | Ksiezopolski et al. | |
| 7,614,677 B2 | 11/2009 | Ksiezopolski et al. | |

* cited by examiner

*Primary Examiner* — Lori Lyjak
(74) *Attorney, Agent, or Firm* — Botkin & Hall, LLP

(57) ABSTRACT

A sealing system useful for sealing a slide out room in a recreational vehicle (RVs). The sealing system includes a first bulb seal that is adapted for being affixed to a transverse surface that defines an opening in a sidewall of the RV. A second bulb seal is affixed to a peripheral flange that extends from an end wall of the slide out room. Both of the bulb seals have an hourglass shape. The peripheral flange fits within the opening when the slide out room is in its retraced position and the bulb seals meet in a complementary fashion to form a seal. A wedge seal is included spaced inwardly on the sidewalls of the slide out room and is designed to contact the bulb seal attached to the opening when the room is extended. An internal flange is not required for sealing when the slide out room is extended.

8 Claims, 6 Drawing Sheets

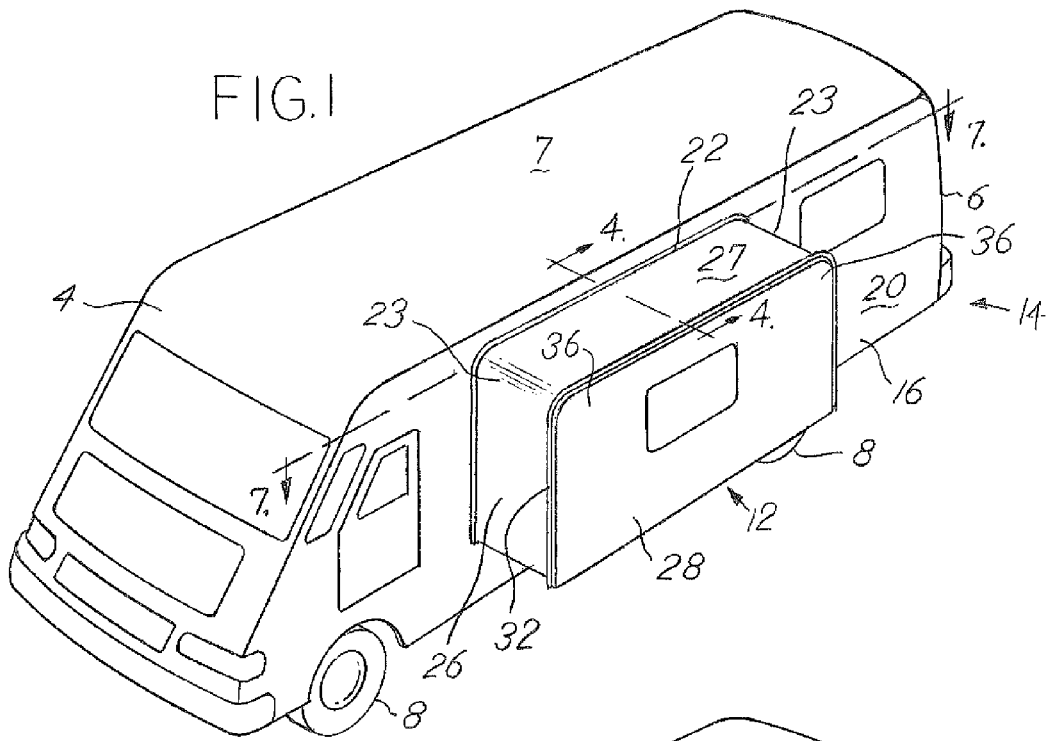

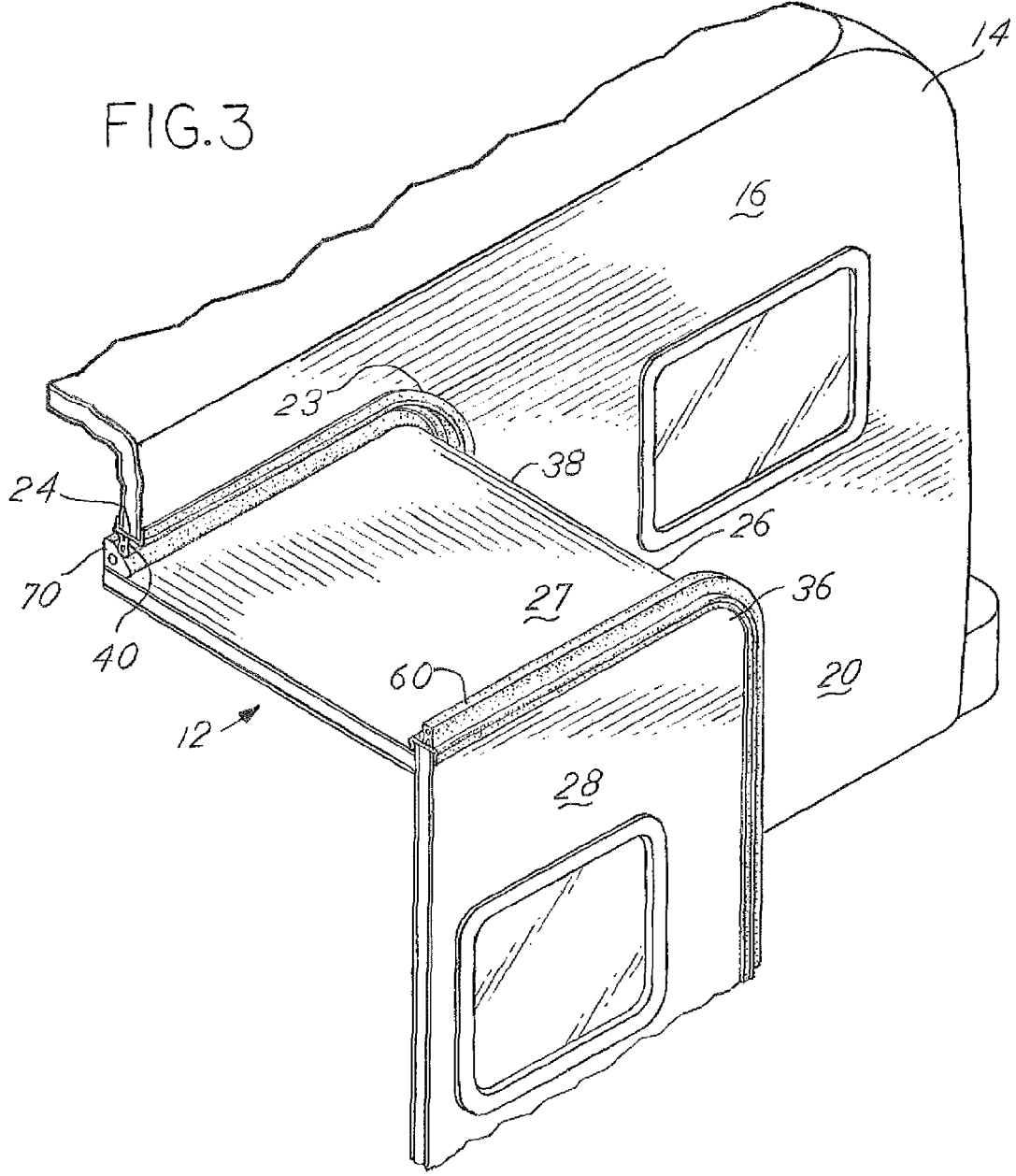

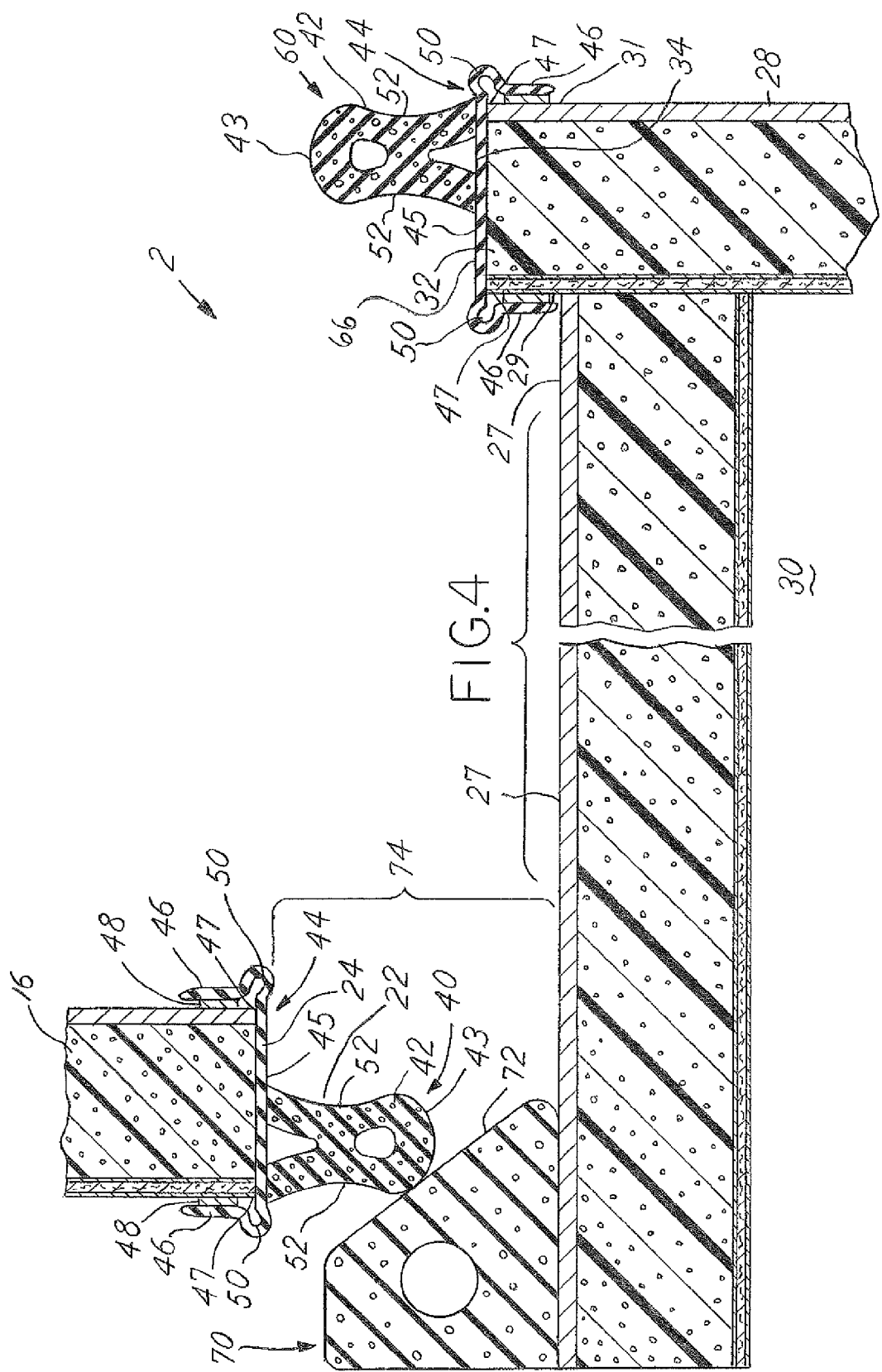

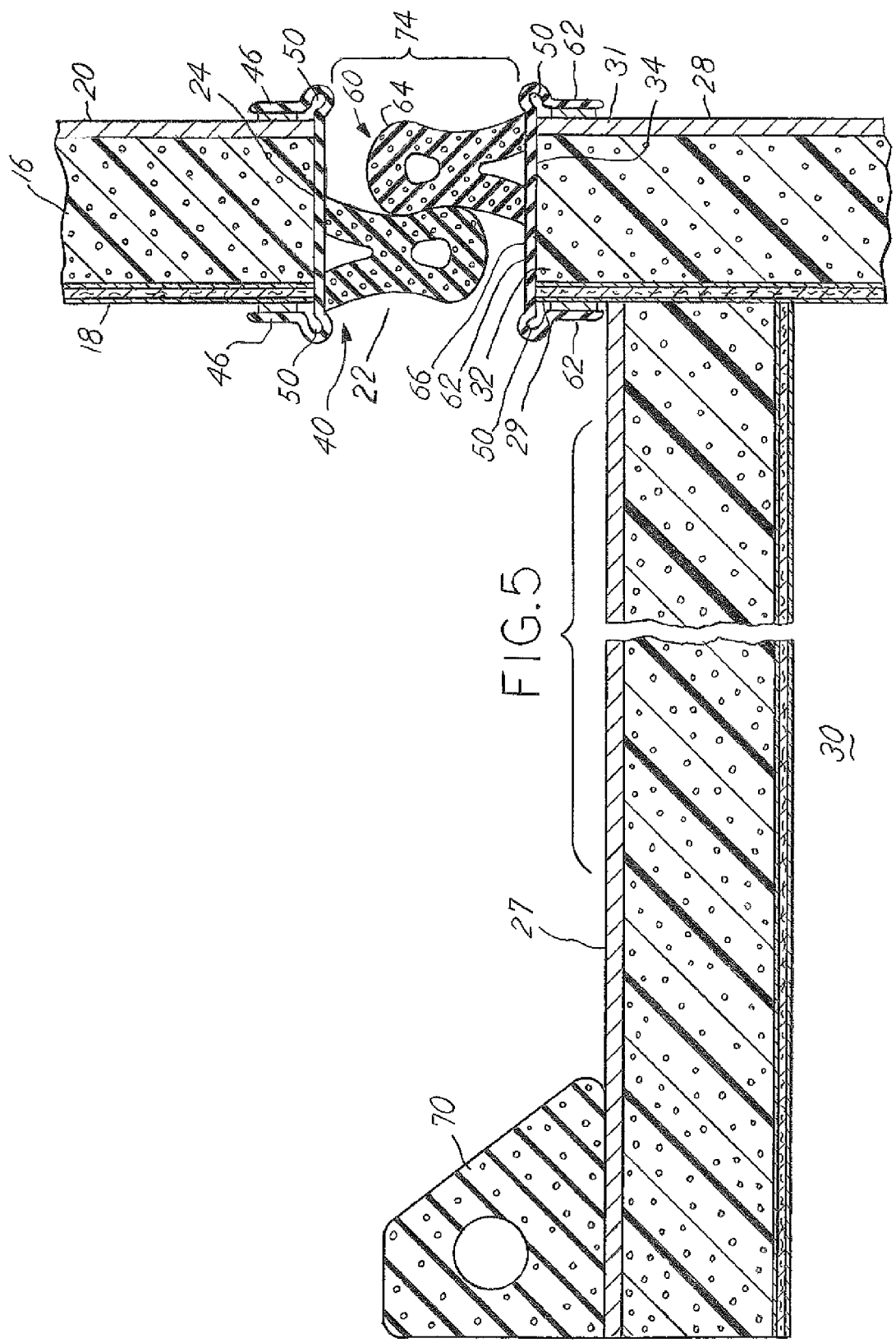

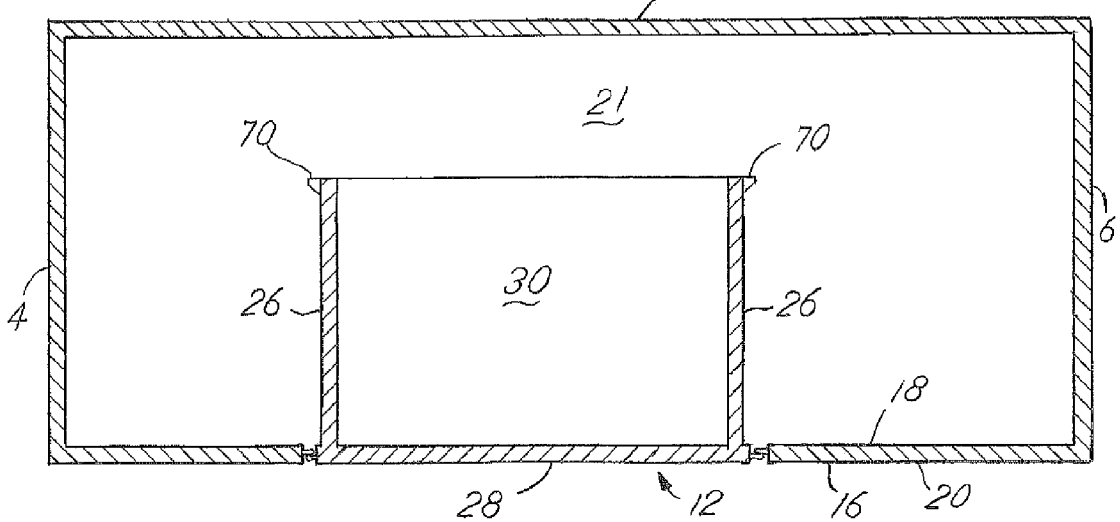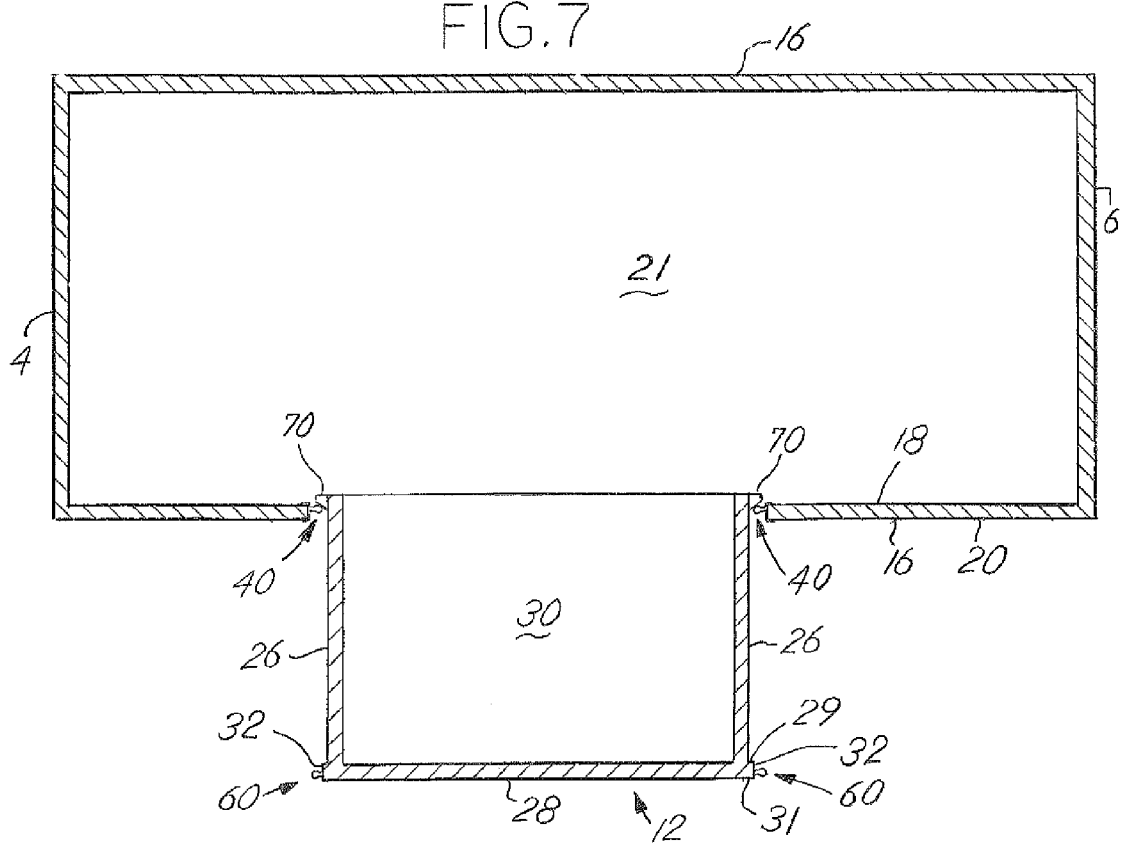

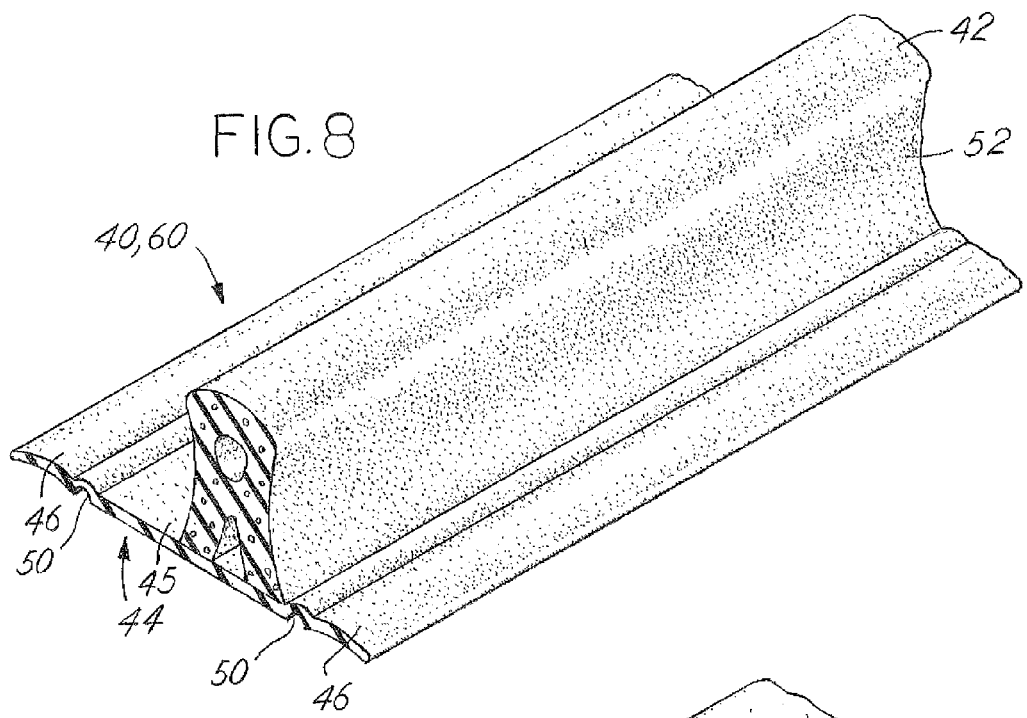
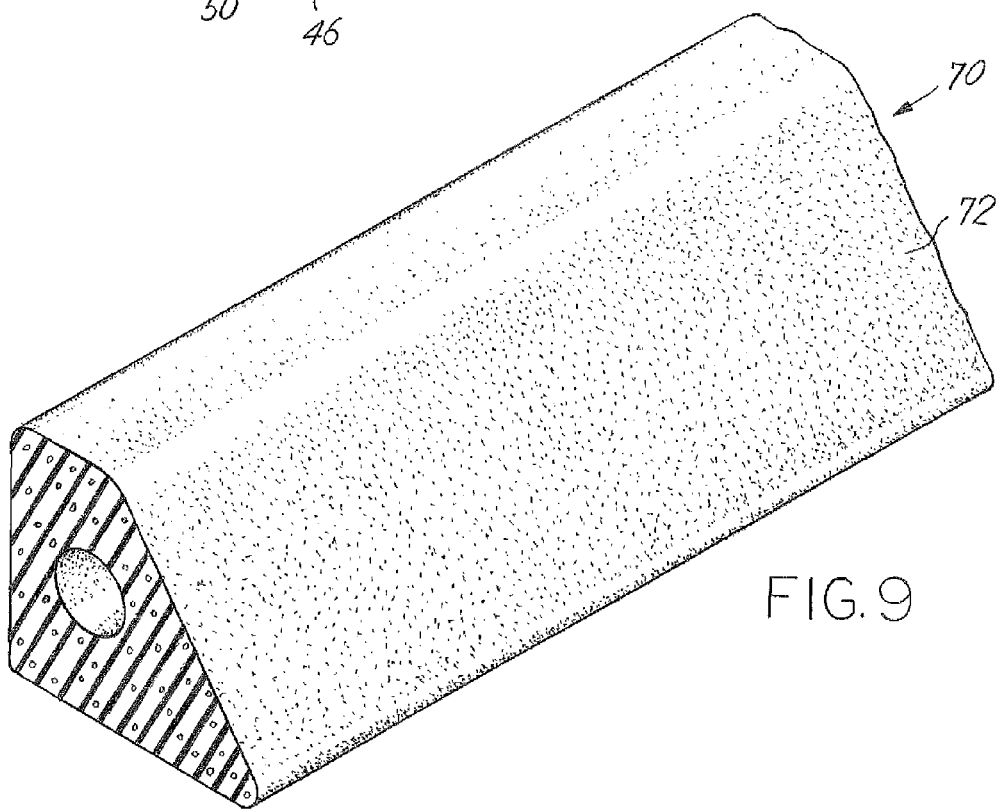

OVERLAPPING COMPLEMENTARY BULB SEAL

REFERENCE TO RELATED APPLICATIONS

This application claims priority based on U.S. Provisional application for patent Ser. No. 61/417,743, filed Nov. 29, 2010, the disclosure of which is hereby incorporated by reference.

BACKGROUND

Slide out rooms have been used to increase the living space within a recreational vehicle. As is always the case, sealing, the slide out room can be difficult. Typically, a slide out room is constructed with two peripheral flanges that extend around the room and are larger than the opening through which the room moves. Assembly of the slide out room into the recreational vehicle would be simplified if the flanges did not extend around the room to an extent that is larger than the opening that accepts the slide out room. However, doing so would diminish the ability to seal the room using traditional construction techniques. It is desirable to have a sealing system adapted for sealing a room which has no flange extending beyond the slide out room opening.

SUMMARY OF THE INVENTION

The present invention is a sealing system used in combination with a recreational vehicle that has a slide out room defining an interior space. The recreational vehicle has a first sidewall having an interior and exterior side. The first sidewall has an opening therethrough in which the slide out room is movable between a retracted and extended position relative to the first sidewall. The opening has a first transverse surface defining the opening and spanning between the interior and exterior sides of the sidewall. The slide out room includes a second sidewall spaced from the first sidewall and an end wall defining the interior space. The end wall including a peripheral flange extending outwardly from the end wall and having a second transverse surface. The slide out room is shiftable between a retracted position and an extended position. In the retracted position the peripheral flange fits within the opening and the first transverse surface is aligned with the second transverse surface. In the extended position the peripheral flange is outwardly spaced from the first sidewall.

The seal system has a first bulb seal adapted for being affixed to the first sidewall along the transverse surface thereon. The first bulb seal has a base including a central portion for spanning the transverse surface. The central portion of the base continuing into mounting flanges being bendable into a position straddling the first sidewall. A first bulb portion of the first bulb seal is upstanding from the base and has opposite sides being concave so that the first bulb portion has an hourglass shape. A second bulb seal is adapted for being affixed to the peripheral flange along the transverse surface thereon. The second bulb seal has a base including a central portion for spanning the second transverse surface. The central portion of the base on the second bulb seal continues into mounting flanges being bendable into a position straddling the peripheral flange. A second bulb portion of the second bulb seal is upstanding from the base and has opposite sides being concave so that the second bulb portion has an hourglass shape. The second bulb seal is positioned so that one of the sides of the second bulb portion mates complementarily with one of the sides of the first bulb portion when the first transverse surface is aligned with the second transverse surface.

BRIEF DESCRIPTION OF THE DRAWINGS

FIG. 1 is a perspective view of the RV in which the seal is installed with its slide out room in its extended position;

FIG. 2 is a perspective of the RV in FIG. 1 with the slide out room in its retracted position;

FIG. 3 is a perspective partial sectional view of the RV shown in FIGS. 1 and 2 with the slide out room in its extended position FIG. 4 is a sectional view taken about line 4-4 in FIG. 1;

FIG. 5 is a sectional view taken about the line 5-5 in FIG. 2;

FIG. 6 is a sectional view taken about the line 6-6 in FIG. 2

FIG. 7 is a sectional view taken about the line 7-7 in FIG. 1;

FIG. 8 is a perspective view of a bulb seal; and

FIG. 9 is a perspective view of a wedge seal.

DETAILED DESCRIPTION OF INVENTION

The present invention is a sealing system 2 that is useful in sealing a slide out room 12 in a recreational vehicle (RV) 14. The RV 14 can be a travel trailer or a mobile home. The RV has a front wall 4, a back wall 6, and a roof 7 that cooperate to define a main living area. In the example of an RV as shown in FIGS. 1 and 2, the RV 14 rides on wheels 8 and is a motor home. Slide out rooms are well known to those skilled in the art for increasing the available space inside an RV. In either the case of a motor home or travel trailer the basic structure of the RV is disclosed in U.S. Pat. Nos. 7,614,676 and 7,614,677 which are hereby incorporated by reference. Differences between the present invention and the aforementioned patents will be discussed below. The RV 14 has first sidewalls 16 that have interior sides 18 and exterior sides 20. FIG. 3 shows the interior and exterior sides 18, 20 of the first sidewall 16. One of the first sidewalls 16 has an opening 22 defined by a transverse surface 24 that spans the interior and exterior sides 18, 20. Corners 23 within the opening 22 are rounded. The opening 22 is adapted for accepting the slide out room 12. The sidewalls 16, roof 7, front wall 4, and back wall 6 define a main interior space 21 that is shown in FIGS. 6 and 7.

The slide out room 12 has second sidewalls 26 and an end wall 28 and a ceiling wall 27 that define a second interior space 30. The end wall 28 includes a peripheral flange 32. The peripheral flange 32 has an interior side 29 and an exterior side 31 that is spanned by a transverse surface 34. The peripheral flange 32 has rounded corners 36. The locations where the sidewalls 26 and ceiling wall 27 meet also have rounded corners 38. It is contemplated that the corners 23, 36, and 38 could be square, however for ease of installation of the sealing system 2, round corners 36, 38 are more conducive to installing the sealing system of the present invention.

A first bulb seal 40 is affixed to the transverse surface 24 of the opening 22 in the first sidewall of the RV 14. The first bulb seal 40 is stationary with respect to the RV 14 and extends around the opening 22 adjacent to the ceiling wall 27 and second sidewalls 26. The first bulb seal 40 has a bulb portion 42 upstanding from a base 44 that includes a central portion 45 mounting flanges 46. The bulb portion 42 is a compressible elastomeric material, typically foam. The bulb portion 42 is relatively wide at where it connects to the base 44, relatively narrow at away from the base 44, then relatively wide nearest its distal end 43 that is farthest from the base 44. The bulb portion 42 has an hourglass shape that is narrowest at its midpoint and wider at both ends. Thus, the bulb portion 42 is concave on both exterior sides 52. The central portion 45 spans the transverse surface 24 to which it is affixed, as shown in FIG. 4. The mounting flanges 46 are separated from the central portion 45 by thinned sections 50 so that when the mounting flanges 46 are folded relative to the central portion 45, corners are formed at the thinned sections 50. The thinned sections 50 form upwardly turned loops that create a relief at their location so that a sharp ninety degree corner to which the bulb seal 40 may be affixed will be covered easily without such a sharp corner obstructing installation. As can be seen, in FIG. 4, corners 47 at the edges of the respective transverse surfaces 24 fit within each relief created by the loops located at the thinned sections 50. The mounting flanges 46 straddle the interior and exterior sides 18, 20 of the first sidewall 16. Adhesive tape 48 secures the mounting flanges 46 to the sides 18, 20 of the sidewall 16. The central portion 45 and flanges of the base 44 are made from the same material which is a solid elastomeric material. The bulb portion 42 is biased closer to one side of the central portion 45, and as shown in FIG. 4, the bulb portion 42 of the first bulb seal 40 is biased to the left side of the central portion 45.

A second bulb seal 60 is affixed to the transverse surface 34 of the peripheral flange 32 and extends around the transverse surface 34 adjacent to the ceiling wall 27 and second sidewalls 26. The second bulb seal 60 is identical to the first bulb seal 40. The central portion 62 of the second bulb seal 60 spans the transverse surface 34 and mounting flanges 62 straddle the interior and exterior sides 29, 31 of the peripheral flange 32. In the case of the second bulb seal 60 it is installed in a mirror opposite fashion to the first bulb seal 40 so that the bulb portion 64 is biased to the right side of the central portion 66 as shown in FIG. 4.

A wedge seal 70 is affixed to the second sidewalls 26 and ceiling wall 27 and is located inwardly of the first and second bulb seals 40, 60. The wedge seal 70 has an angled front face 72 that is adapted for meeting a side of the first bulb seal 40. The wedge seal 70 is a foam polymer and may be secured to the ceiling wall 27 as shown in FIG. 4 with adhesive, or may be secured with adhesive tape.

The peripheral flange 32 is designed to fit within the opening 22 with a gap 74. This is significantly different than typical slide out rooms of the prior art because typically, peripheral flanges of the prior art are designed to overlap and cover the gap 74. The first and second bulb seals 40, 60 fit within the gap 74 when the slide out room 12 is in its retracted position. This is shown in FIG. 5. When the bulb seals 40, 60 meet, the widest part of each bulb seal 40, 60 near their respective distal ends 43 meet with the narrowest part of the other bulb seal 40, 60 on their corresponding concave sides 52. The two seals 40, 60 meet in complementary fashion and a watertight seal is formed between the seals 40, 60. In the retracted position of the slide out room 12, the peripheral flange 32 and end wall 28 are flush with the first sidewall 16. In the extended position, the wedge seal 70 contacts the first bulb seal 40 to form a watertight seal between the first bulb seal 40 and the wedge seal 70. The wedge seal 70, and bulb seals 40, 60 are continuous around the periphery of the opening 22, sidewalls 26, ceiling wall 27, and peripheral flange 32. No joints are required in the corners 23, 36, and this reduces the likelihood of leakage. Unlike the prior art construction of slide out rooms, the present invention does not require an internal peripheral flange such as that disclosed in U.S. Pat. Nos. 7,614,676 and 7,614,677. This reduces construction cost and simplifies removal of the slide out room 12 if it is later necessary for maintenance.

The present invention is not limited to the details given above, but may be modified within the scope of the following claims.

What is claimed is:

1. A sealing system used in combination with a recreational vehicle having a slide out room defining an interior space, said recreational vehicle having a first sidewall including an interior and exterior side, said first sidewall having an opening therethrough which said slide out room is movable between a retracted and extended position relative to said first sidewall, said opening having a first transverse surface defining said opening and spanning between said interior and exterior sides of said sidewall, said slide out room including a second sidewall spaced from said first sidewall and an end wall defining said interior space, said end wall including a peripheral flange extending outward from said end wall and having a second transverse surface, said slide out room being shiftable between a retracted position in which said peripheral flange fits within said opening, said first transverse surface being substantially aligned with said second transverse surface and an extended position wherein said peripheral flange is outwardly spaced from said first sidewall, said seal system comprising:

a first bulb seal adapted for being affixed to said first sidewall along said transverse surface thereon, said first bulb seal having a base including a central portion for spanning said transverse surface, said central portion of said base continuing into mounting flanges being bendable into a position straddling said first sidewall, a first bulb portion of said first bulb seal upstanding from said base and having opposite sides being concave so that said first bulb portion has an hourglass shape;

a second bulb seal adapted for being affixed to said peripheral flange along said transverse surface thereon, said second bulb seal having a base including a central portion for spanning said second transverse surface, said central portion of said base continuing into mounting flanges being bendable into a position straddling said peripheral flange, a second bulb portion of said second bulb seal upstanding from said base and having opposite sides being concave so that said second bulb portion has an hourglass shape, said second bulb seal positioned so that one of said sides of said second bulb portion mates complementarily with one of said sides of said first bulb portion when said first transverse surface is substantially aligned with said second transverse surface.

2. The sealing system of claim 1, further comprising a wedge seal mounted to said second sidewall spaced inwardly of said peripheral flange, said wedge seal having an inclined face facing toward said peripheral flange, said first bulb portion adapted for making contact with said inclined face when said slide out room is in its extended position.

3. The sealing system of claim 2, wherein said central portions of said bases of said bulb seals include thinned sections at locations where said mounting flanges meet said central portions.

4. The sealing system of claim 3, wherein said thinned sections form upturned loops forming a relief adapted for receiving a sharp corner.

5. The sealing system of claim 4, wherein said bulb portions of said bulb seals are located nearer one of said mounting flanges than said other mounting flange.

6. The sealing system of claim 1, wherein said central portions of said bases of said bulb seals include thinned sections at locations where said mounting flanges meet said central portions.

7. The sealing system of claim 6, wherein said thinned sections form upturned loops forming a relief adapted for receiving a sharp corner.

8. The sealing system of claim 7, wherein said bulb portions of said bulb seals are located nearer one of said mounting flanges than said other mounting flange.

* * * * *